United States Patent
Miller et al.

(10) Patent No.: US 6,526,517 B1
(45) Date of Patent: Feb. 25, 2003

(54) STAGGERED COMPUTER COMPONENT STARTUP

(75) Inventors: Kevin L. Miller, Austin, TX (US); Bruce C. Bell, Austin, TX (US)

(73) Assignee: Dell USA L.P., Round Rock, TX (US)

( * ) Notice: Subject to any disclaimer, the term of this patent is extended or adjusted under 35 U.S.C. 154(b) by 0 days.

(21) Appl. No.: 09/459,228

(22) Filed: Dec. 10, 1999

(51) Int. Cl.$^7$ ................................................. G06F 1/06
(52) U.S. Cl. ..................................................... 713/500
(58) Field of Search ................................ 713/300, 330, 713/500, 501; 711/167, 169

(56) References Cited

U.S. PATENT DOCUMENTS

| | | | |
|---|---|---|---|
| 5,369,771 A | 11/1994 | Gettel | |
| 5,410,711 A | 4/1995 | Stewart | |
| 6,134,145 A | * 10/2000 | Wong | 365/185.22 |
| 6,314,025 B1 | * 11/2001 | Wong | 365/185.22 |

* cited by examiner

Primary Examiner—Thomas M. Heckler
(74) Attorney, Agent, or Firm—Haynes and Boone, LLP

(57) ABSTRACT

A system for reducing the startup current demand of a computer system by providing clock signals at normal operating frequencies to a plurality of computer components in a staggered progression. The computer system includes a clock buffer having a plurality of outputs each for providing a clock signal to at least one computer component. During the startup of the computer system, the clock buffer provides at each output a clock signal at a normal operating frequency to each component in a staggered progression with the other outputs. Consequently, only one component (or component group) becomes operational at a time during the startup of the computer system. In one example, each output of the clock buffer is coupled to a memory module that includes multiple SDRAM chips. Because each memory module has a high initial current draw for initially charging its SDRAM cells, providing the clock signals at a normal operating frequency in a staggered progression provides a computer system where only one memory module is initially charging its memory cells at one time.

28 Claims, 2 Drawing Sheets

STAGGERED COMPUTER COMPONENT STARTUP

BACKGROUND

The present disclosure relates in general to computer systems and in particular to reducing the current demand of a computer system during its startup.

DESCRIPTION OF THE RELATED ART

Computer systems are information handling electronic systems which can be designed to give independent computing power to one user or a plurality of users. Computer systems may be found in many forms including, for example, mainframes, minicomputers, workstations, servers, personal computers, internet terminals, notebooks, and embedded systems. Computer systems include desk top, floor standing, rack mounted, or portable versions. A typical computer system includes at least one system processor, associated memory and control logic, and peripheral devices that provide input and output for the system. Such peripheral devices may include display monitors, keyboards, mouse-type input devices, floppy and hard disk drives, CD-ROM drives, printers, network capability card circuits, terminal devices, modems, televisions, sound devices, voice recognition devices, electronic pen devices, and mass storage devices such as tape drives, CD-R drives, or DVDs.

During the startup of a computer system such as during the initial powering up of a computer system, computer components such as system memory modules can draw a relatively large amount of current during the time that they become operational. For example, some memory modules include multiple DRAM chips that require a relatively large current draw to charge the memory cells of the DRAM circuits. Some existing memory modules may draw up to 5 amps during the initial charging of the memory cells. Future modules may draw more. Because a computer system may include a relatively large number of system memory modules (e.g., 32), the momentary current demand of the computer system during startup may exceed the capacity of the computer system's power supply.

To compensate for the large current demand during startup, a computer system may be outfitted with a larger power supply. However, providing a computer system with a larger power supply can increase the cost of a computer system as well as reduce the available space for other components in a computer system chassis. Such an option is not feasible with some computer systems such as a portable computer system. Also, some computer systems are safety rated based upon the size of their power supply. Consequently, providing a computer system with a larger power supply may also provide the computer system with an undesirably higher safety rating, thereby restricting the sale of the computer system to a limited number of consumers. Furthermore, some large capacity power supplies do not operate efficiently at low current conditions. Consequently, sizing a power supply to meet a large current demand during startup may provide a computer system with a power supply that operates inefficiently during the normal operation of the computer system.

What is desirable is to reduce the current demand of a computer system during the startup of the computer system.

SUMMARY

It has been discovered that staggering the startup current draw of a plurality of computer components advantageously reduces the current demand of a computer system during startup.

In one aspect of the embodiments of the present disclosure, a computer system includes a plurality of computer components and a clock circuit having a plurality of outputs. Each of the plurality of outputs is coupled to at least one of the plurality of computer components to provide a clock signal at a normal operating frequency in a stagerred progression with the outputs of the plurality of outputs during a startup of the computer system.

In another aspect, the present embodiment includes a method for making operational a plurality of computer components during the startup of a computer system. The method includes providing a first clock signal at a normal operating frequency to a first computer component. The method also includes providing, after the providing of the first clock signal, a second clock signal at a normal operating frequency to a second computer component.

In yet another aspect of the embodiments of the present disclosure, a computer system includes at least one system processor and a system memory operably coupled to the at least one system processor. The system memory includes a plurality of memory modules. The computer system also includes means for staggering an initial charging current draw of the plurality of memory modules during a startup of the computer system.

BRIEF DESCRIPTION OF THE DRAWINGS

The present embodiments may be better understood, and its numerous objects, features, and advantages made apparent to those skilled in the art by referencing the accompanying drawings.

The use of the same reference symbols in different drawings indicates identical items unless otherwise noted.

DETAILED DESCRIPTION

The following sets forth a detailed description of a mode for carrying out the embodiments of the present disclosure. The description is intended to be illustrative of the embodiments and should not be taken to be limiting.

Figure 1:
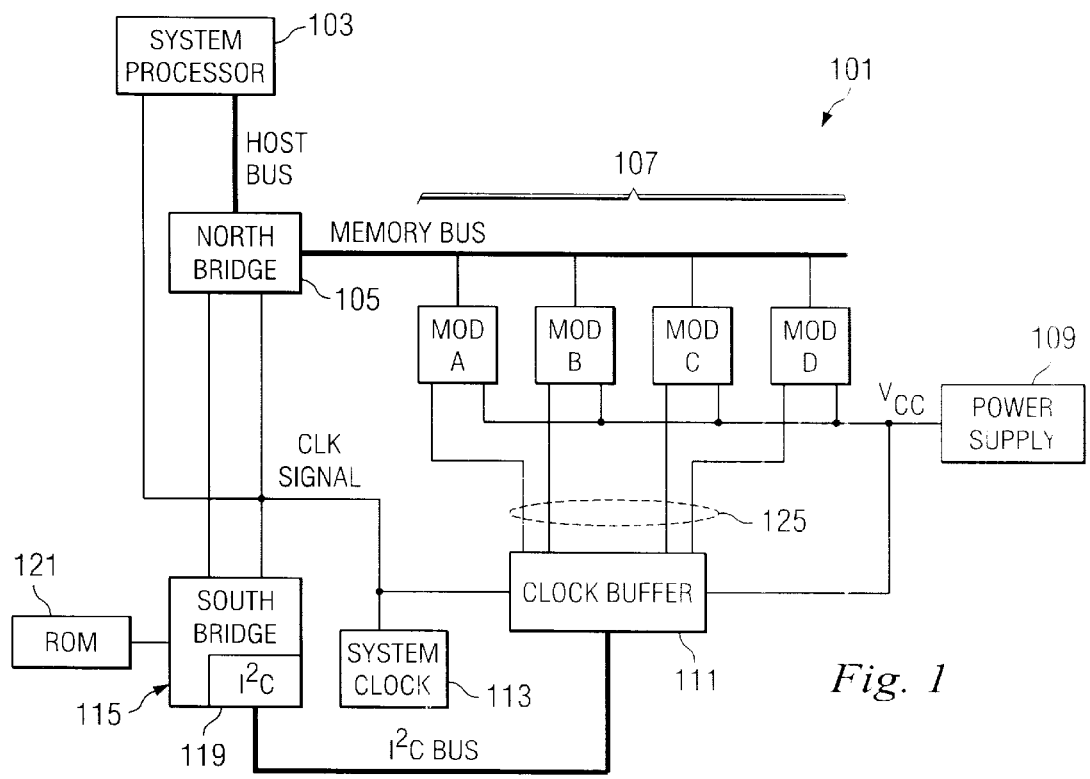
FIG. 1 is a block diagram of an example of computer components according to the present embodiments.

FIG. 1 is a block diagram of computer components according to one embodiment of the present disclosure. Computer system 101 includes a system processor 103 and a system memory 107 having four system memory modules designated as Mod A, Mod B, Mod C, and Mod D. An example of a system processor is the PENTIUM III processor sold by INTEL™. System memory 107 is operably coupled to system processor 103 via a Memory Bus, a north bridge circuit 105 (with an integrated memory controller circuit, not shown), and a Host Bus. In one embodiment, north bridge circuit 105 is implemented with the RCC 3.0LE, SERVERSET III chipset sold by the RELIANCE COMPUTER CORPORATION. An example of a system memory module is a Dual In line Memory Module (DIMM) that includes 12 Synchronous Dynamic RAM (SDRAM) chips (not shown) and an Error Correcting Code (ECC) circuit (not shown). A DIMM module is typically implemented on an add in card inserted into a slot connector (not shown) connected to the Memory Bus. One example of a DIMM is the HB52RF1289E2-75B sold by HITACHI™. However, other computer systems may include other types of system memory modules. For example, other types of system memory modules may include other types of memory circuits such as Synchronoous RAM (SRAM) chips, RAMBUS DRAM chips, Double Data Rate (DDR) SDRAM chips, or other types of RAM chips. Also, other types of memory modules may have other configurations. For example, some memory modules may include only one memory chip while others may include other circuits as well, such as e.g., a memory controller. With other computer systems, the system memory modules may be mounted on the system board (not shown) of the computer system. Also, other computer systems may include a greater or lesser number of system memory modules.

Computer system 101 includes a power supply 109 having an output (Vcc) for supplying DC power to the components of computer system 101 including the memory modules A–D. Power supply 109 is a switching power supply that includes an AC to DC rectifier (not shown) and multiple DC to DC converters (not shown) for providing direct current at multiple voltages. However, other computer systems may include other types of power supplies and/or multiple power supplies.

Computer system 101 includes a clock buffer 111 having a plurality of outputs 125 for providing clock signals to each memory module. In one embodiment, during the normal operation of memory modules A–D, clock buffer 111 provides at each of its outputs 125, a clock signal having a frequency of 133 MHz. With other computer systems, a clock buffer may provide clock signals at other operating frequencies during normal operations. Clock buffer 111 includes an input for receiving a system clock signal from system clock circuit (sys clk) 113. Clock buffer 111 has another input for receiving operating commands via the I²C interface circuit 119 of south bridge circuit 115. One example of a clock buffer is a W40S12-24 clock buffer/driver circuit sold by IC WORKS of San Jose, Calif. In other embodiments, system clock circuit 113 and clock buffer 111 are integrated in a single circuit. Computer system 101 also includes a non volatile ROM 121 that stores BIOS code executable by the system processor 103.

Prior to becoming operational, memory modules A–D typically have a relatively large current demand due to the initial charging of the memory cells of the SDRAM circuits of these modules. The current demand of a memory module with DRAM memory cells is typically directly proportional to the frequency of the clock signal supplied to the memory module. With some memory modules, each module may draw as much as five amps during the initial charging of its memory cells. If the memory cells of all memory modules are charged at the same time during startup, the momentary current demand may exceed the peak capacity of power supply 109.

Accordingly, computer system 101 staggers the initial charging of the memory cells of each memory module A–D during the startup of computer system 101. This is accomplished by providing to each memory module a clock signal at a normal operating frequency in a staggered progression.

Figure 2:
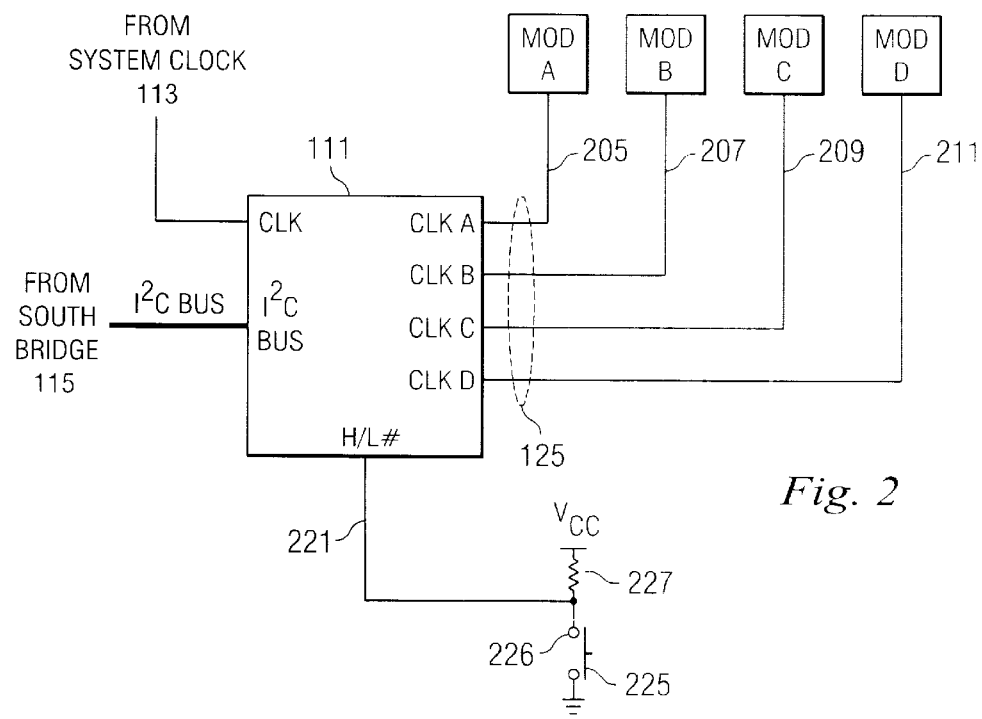
FIG. 2 is a block diagram of an example of a clock circuit according to the present embodiments.

FIG. 2 is a block diagram showing the coupling of clock buffer 111 to other components of computer system 101. During startup, clock buffer 111 staggers providing a clock signal at a normal operating frequency at each of its outputs such that only one memory module (A–D) is drawing a relatively large amount of initial charging current at one time.

In the embodiment shown, clock buffer 111 includes an input terminal 221 for setting a reset default output of clock outputs 205, 207, 209, and 211. Input terminal 221 is electrically connected to a pull-up resistor 227 and a strap terminal 226. Coupling strap terminal 226 to system ground with strap 225 pulls the voltage level of input terminal 221 to ground. When the voltage level of input terminal 221 is low (e.g., system ground), clock buffer 111 provides at its outputs 205, 207, 209, and 211 a clock signal at a non normal operating frequency (e.g., 0 HZ) in response to a reset of the system voltages. If the voltage level at input terminal 221 is high (e.g., strap 225 is not connected to terminal 226), then clock buffer 111 provides at its outputs 205, 207, 209, and 211 a clock signal at a normal operating frequency (e.g., 133 MHz) in response to a reset of the system voltages. Providing clock buffer 111 with input terminal 221 allows clock buffer 111 to be used either 1) to provide at its outputs, clock signals initially at non normal operating frequencies and then be commanded to provide clock signals at normal operating frequencies in a staggered progression, or 2) to be used as a clock buffer that provides clock signals at normal operating frequencies in response to a reset of the system voltages. However, other clock buffers may not include an input terminal similar to input terminal 221. With other systems, clock buffer 111 may provide at each output a clock signal at a lower non operating frequency (e.g., 1 KHz) prior to providing a clock signal at a normal operating frequency.

Referring back to FIG. 1, during one example of a startup of computer system 101, in response to a reset of system voltages, system processor 103 initially executes BIOS code stored in ROM 121. Because input terminal 221 is at low voltage level, after power is initially provided to clock buffer 111, all outputs 125 of clock buffer 111 are providing a clock signal at a non normal operating frequency such as e.g., 0 HZ. Consequently, none of the memory modules (A–D) are drawing the maximum initial charging current. Referring back to FIG. 2, in response to receiving a command from the I²C bus, clock buffer 111 provides a clock signal at a normal operating frequency (such as, e.g., a frequency that the memory module receives under normal operating conditions) at output 205 to memory module A. In response to receiving a clock frequency at a normal operating frequency, memory module A becomes operational and initiates a refresh cycle to initially charge its SDRAM memory cells during which time it draws a relatively large amount of current from power supply 109.

After a predetermined period of time during which the SDRAM cells of memory module A finish charging, clock buffer 111 receives a command from I²C bus to provide a clock signal at a normal operating frequency at output 207 to memory module B. In response to receiving a clock signal at a normal operating frequency, memory module B becomes operational and initiates a refresh cycle to initially charge its SDRAM memory cells. With some memory modules, the refresh charge cycle lasts for 64 milliseconds. After a predetermined period of time during which the SDRAM cells of memory module B finish charging, clock buffer 111 receives a command from the I²C bus to provide a clock signal at a normal operating frequency at output 209 to memory module C. In response to receiving a clock signal at a normal operating frequency, memory module C becomes operational and initiates a refresh cycle to initially charge its SDRAM memory cells. After a predetermined period of time during which the refreshed cells of memory module C finish charging, clock buffer 111 receives a command from I²C bus to provide a clock signal at a normal operating frequency at output 211 to memory module D. In response to receiving a clock signal at a normal operating frequency, memory module D becomes operational and initiates a refresh cycle to initially charge its DRAM memory cells.

In one embodiment, execution of the BIOS program stored in ROM initiates the providing of each I²C command to clock buffer 111 via the I²C interface 119 of South bridge circuit 115. In this embodiment, system processor 103, executing BIOS code, issues a plurality of processor commands at predetermined intervals to south bridge circuit 115 to provide, for each processor command, an I²C command to provide a clock signal at a normal operating frequency at a clock buffer output 125. With other embodiments, south bridge circuit 115 generates each I²C command in performing reset operations or other operations as per the contents of its integrated memory. Still in other embodiments, the system processor, executing BIOS code, commands south bridge circuit 115 to initiate a routine by the south bridge circuit 115 to provide the plurality of I²C commands at predetermined intervals. With other embodiments, south bridge circuit 115 provides a single I²C command (either generated by south bridge circuit 115 or in response to receiving a command generated by the execution of BIOS code by system processor 103) to command clock buffer 111 to begin providing the clock signals in a staggered progression as per a routine in the contents of an integrated memory of clock buffer 111. Still in other embodiments, the clock buffer provides a clock signal at an operating frequency at each of its outputs in a staggered progression as per a reset routine in the contents of an integrated memory of clock buffer 111.

In other embodiments, the initiation of the providing of each of the clock signals at a normal operating frequency in a staggered progression may incorporate feed back from the memory modules (A–D) or from other circuits. For example, each memory module (A–D) may provide an indication that its initial charging of its memory cells is complete. Such an indication would be readable by either system processor 103 (executing BIOS or other routine), south bridge circuit 115, or clock buffer 111. A clock signal at a normal operating frequency would not be provided to the next memory module until the previous memory module that received a clock signal at a normal operating frequency had completed its initial cell charging.

After the SDRAM cells of the memory modules have been charged, portions of the BIOS code stored in ROM 121 are shadowed to locations in the system memory 107. In some embodiments, some memory modules may receive a clock signal at a normal operating frequency immediately after the reset of the system voltages. Once the memory cells of those modules are charged, BIOS code from ROM 121 is shadowed to those memory modules. A clock signal at a normal operating frequency is provided to the remaining memory modules in a staggered progression during the execution of shadowed BIOS code. With other computer systems, the execution of other routines by system processor 103 may initiate the providing of each of the clock signals at a normal operating frequency in a staggered progression.

The providing of clock signals at normal operating frequencies to the system memory modules may be used to reduce the current demand during the startup of the computer systems from different power states or during the startup of the computer system due to a reset. For example, the clock signals may be staggered during the startup from a completely off power state, a soft off power state, a hibernation power state, or other sleeping power states that require the initial charging of the memory cells of a memory module prior to becoming operational.

Figure 3:
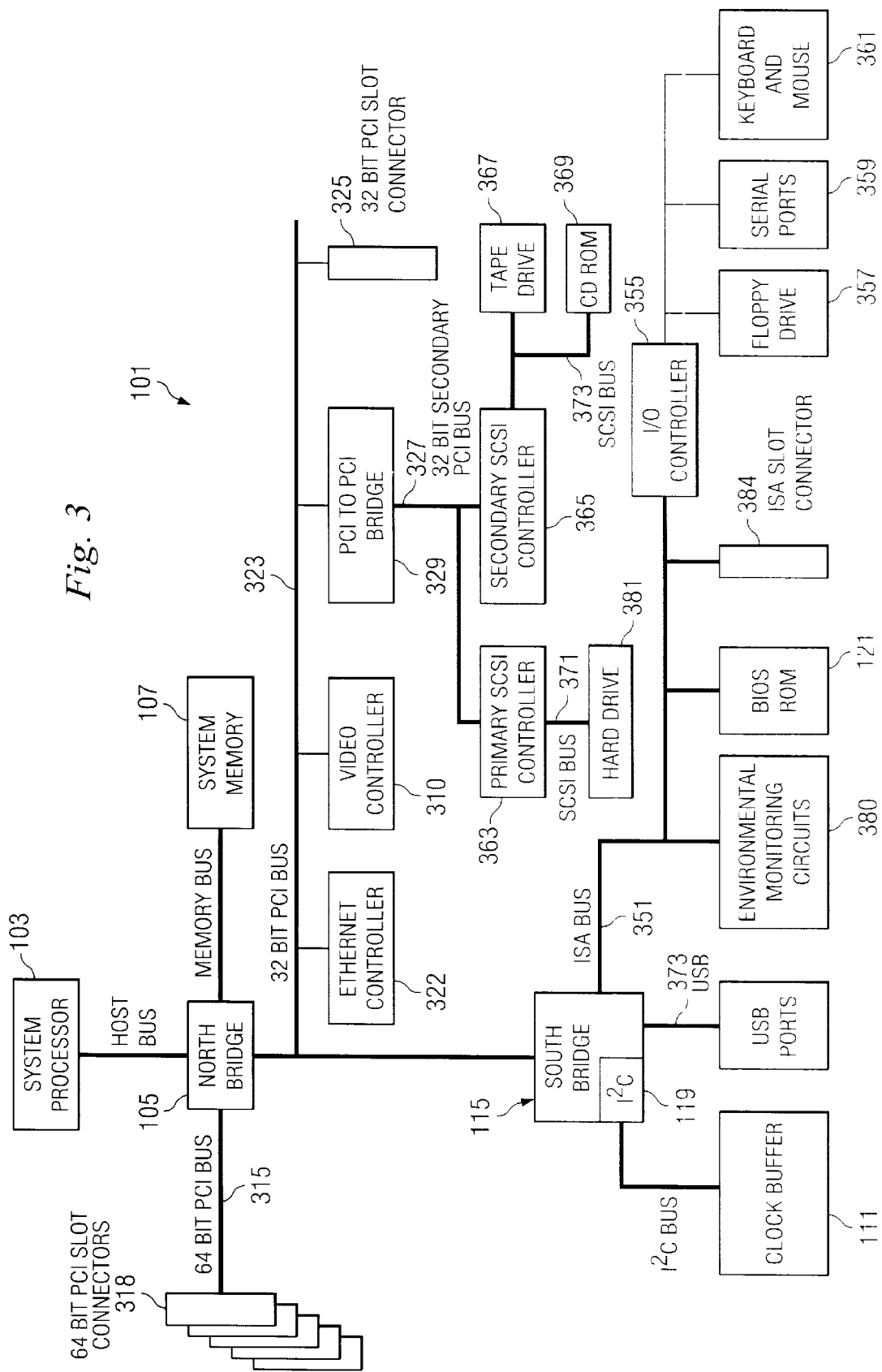
FIG. 3 is a block diagram of an example of a computer system according to the present embodiments.

FIG. 3 is a block diagram showing other computer components of computer system 101. Computer system 101 includes a number of computer busses conforming to various computer bus standards that enable system processor 103 to be operably coupled to multiple computer components. Computer bus 315 is a 64 bit computer bus conforming to the Peripheral Component Interface (PCI) local bus specification, rev. 2.2. 64 bit PCI card slot connectors 318 are located on computer bus 315 and are operably coupled to north bridge circuit 105. Computer bus 323 is a 32 bit computer bus conforming to the PCI specification. Computer bus 323 is operably coupled to system processor 103 via north bridge circuit 105. Located on PCI computer bus 323 are video controller 310, ethernet controller 322, and PCI card slot connector 325, which are all mounted on a system board (not shown). Computer system 101 also includes a secondary 32 bit PCI computer bus 327 operably coupled to computer bus 323 via a PCI-to-PCI bridge 329. A primary SCSI controller 363 and a secondary SCSI controller 365 are located on PCI bus 327. A hard disk drive 381 is operably coupled to SCSI controller 363 via SCSI bus 371. Hard disk drive 381 stores application and operating system code. A tape drive 367 and CD ROM drive 369 are operably coupled to SCSI controller 365 via SCSI bus 373.

South bridge circuit 115 is also located on PCI bus 323. In one embodiment, south bridge circuit 115 is implemented with an OSB4 chipset sold by the RELIANCE COMPUTER CORPORATION. Other computer components (not shown) may also be operably coupled to PCI busses 315, 323, and 327 including components (not shown) located on computer cards inserted into card slot connectors 318 and 325. Such components include remote access circuits such as LAN connector circuits, modem circuits, and sound card circuits.

Computer system 101 also includes computer bus 351 which conforms to the Industry Standard Architecture (ISA) bus standard. ISA computer bus 351 is operably coupled to system processor 103 via south bridge circuit 115. Operably coupled to ISA computer bus 351 are BIOS ROM 121, environmental monitoring circuits 380, ISA slot connector 384, and I/O controller 355. Operably coupled to the I/O controller 355 are a floppy disk drive 357, a serial port 359, and a keyboard and mouse 361. Computer system 101 also includes a computer bus 373 conforming to the Universal Serial Bus (USB) standard. Other conventional computer components (not shown) may be coupled via the computer busses and may be located either on computer cards or mounted to a system board of computer system 101.

Those of skill in the art will recognize that, based upon the teachings herein, several modifications may be made to the embodiments shown in FIGS. 1–3 and described herein. For example, a clock signal may be staggered to other components during startup to reduce the power demand of the computer system. For example, in a multiprocessor system, a system clock signal at a normal operating frequency may be staggered to some of the processors that are non essential for startup. With other computer systems, a clock buffer similar to clock buffer 111 maybe incorporated in a memory module where a clock signal at a normal operating frequency is provided in a staggered progression to each DRAM chip of the module.

While particular embodiments of the present disclosure have been shown and described, it will be recognized to those skilled in the art that, based upon the teachings herein, further changes and modifications may be made without departing from the present embodiment and its broader aspects, and thus, the appended claims are to encompass within their scope all such changes and modifications as are within the true spirit and scope of the present embodiments.

What is claimed is:

1. A computer system comprising:
   a plurality of computer components;
   a clock circuit having a plurality of outputs, each of the plurality of outputs coupled to at least one of the plurality of computer components to provide a clock signal at a normal operating frequency in a staggered progression with the other outputs of the plurality of outputs during a startup of the computer system.

2. The computer system of claim 1 wherein each of the plurality of computer components includes a system memory module.

3. The computer system of claim 2 wherein:
   the period of time of the staggered progression between providing at a first output a first clock signal at a normal operating frequency and providing at a second output a second clock signal at the normal operating frequency is greater than a period of time for an initial charging cycle of memory cells of the memory module.

4. The computer system of claim 2 wherein each of the plurality of system memory modules further includes at least one DRAM chip.

5. The computer system of claim 1 wherein the outputs of the clock circuit provide a clock signal at a non normal operating frequency prior to providing a clock signal at a normal operating frequency during a startup.

6. The computer system of claim 5 wherein the non normal operating frequency is at 0 Hz.

7. The computer system of claim 1 wherein the clock circuit further includes:
   a input for receiving commands to provide a clock signal at a normal operating frequency at its outputs.

8. The computer system of claim 7 wherein the commands are provided to the clock circuit based upon a protocol substantially conforming to an I²C computer bus standard.

9. The computer system of claim 7 further comprising:
   memory having means for initiating the providing of a plurality of commands in a staggered progression to the input, each of the plurality of commands for commanding the clock circuit to provide at an output of the plurality of outputs a clock signal at a normal operating frequency.

10. The computer system of claim 9 wherein the memory stores BIOS code, the means for initiating being implemented in the BIOS code.

11. The computer system of claim 9 wherein the memory is integrated in the clock circuit.

12. The computer system of claim 1 further comprising:
    means for commanding the clock circuit to provide at its outputs a clock signal at a normal operating frequency to each of the plurality of computer components in the staggered progression during the startup of the computer system.

13. The computer system of claim 1 further comprising:
    a system clock circuit coupled to the clock circuit to provide a clock signal to the clock circuit at a normal operating frequency.

14. The computer system of claim 1 wherein the normal operating frequency is above 10 MHz.

15. The computer system of claim 1 wherein the clock circuit includes an input for receiving a signal to place the clock circuit in a first state upon a reset of a computer system voltage, in the first state, the clock circuit providing non operational frequencies at each of its plurality of outputs.

16. The computer system of claim 1 where the plurality of outputs of the clock circuit includes at least four outputs.

17. A method for making operational a plurality of computer components during a startup of a computer system:
    providing a first clock signal at a normal operating frequency to a first computer component; and
    providing, after the providing of the first clock signal, a second clock signal at a normal operating frequency to a second computer component, wherein providing the first clock signal and the second clock signal includes providing a clock signal at a normal operating frequency in a staggered progression with more than one output of a plurality of outputs coupled to at least one of the plurality of computer components during the startup of the computer system.

18. The method of claim 17 further comprising:
    providing, after the providing of the second clock signal, a third clock signal at a normal operating frequency to a third computer component.

19. The method of claim 18 further comprising:
    providing, after the providing of the third clock signal, a fourth clock signal at a normal operating frequency to a fourth computer component.

20. The method of claim 17 wherein the first and second computer components each include a system memory module.

21. The method of claim 20 further comprising:
    initially charging memory cells of a first memory module of the first computer component after the providing of the first clock signal;
    initially charging memory cells of a second memory module of the second computer component after the providing of the second clock signal.

22. A method for making operational a plurality of computer components during a startup of a computer system comprising:
    providing a first clock signal at a normal operating frequency to a first computer component;
    providing, after the providing of the first clock signal, a second clock signal at a normal operating frequency to a second computer component; and
    providing a command signal to a clock circuit to command the clock circuit to provide the first clock signal at a normal operating frequency.

23. The method of claim 22 further comprising:
    providing a second command signal to a clock circuit to command the clock circuit to provide the second clock signal at a normal operating frequency.

24. The method of claim 22 further comprising:
    executing BIOS code by a system processor to provide the command signal.

25. The method of claim 24 wherein the BIOS code is executed during a computer startup procedure.

26. A method for making operational a plurality of computer components during a startup of a computer system comprising:
    providing a first clock signal at a normal operating frequency to a first computer component; and
    providing, after the providing of the first clock signal, a second clock signal at a normal operating frequency to a second computer component, wherein the second clock signal is provided after a predetermined period of time from the first clock signal.

27. The method of claim 26 wherein:
    wherein the first and second computer components each include a memory module with each memory module having memory cells;

the period of time between providing the first clock signal at a normal operating frequency and providing the second clock signal at a normal operating frequency is greater than a period of time for an initial charging cycle of the memory cells of the memory modules.

28. A computer system comprising:

at least one system processor;

a system memory operably coupled to the at least one system processor, the system memory including a plurality of memory modules; and means for staggering an initial charging current draw of the plurality of memory modules during a startup of the computer system, wherein said means for staggering the initial charging current draw of the plurality of memory modules includes means for providing a first clock signal at a normal operating frequency to a first memory module, and means for providing, after the providing of the first clock signal, a second clock signal at a normal operating frequency to a second memory module, wherein the second clock signal is provided after a predetermined period of time from the first clock signal.

* * * * *